Figure 1:
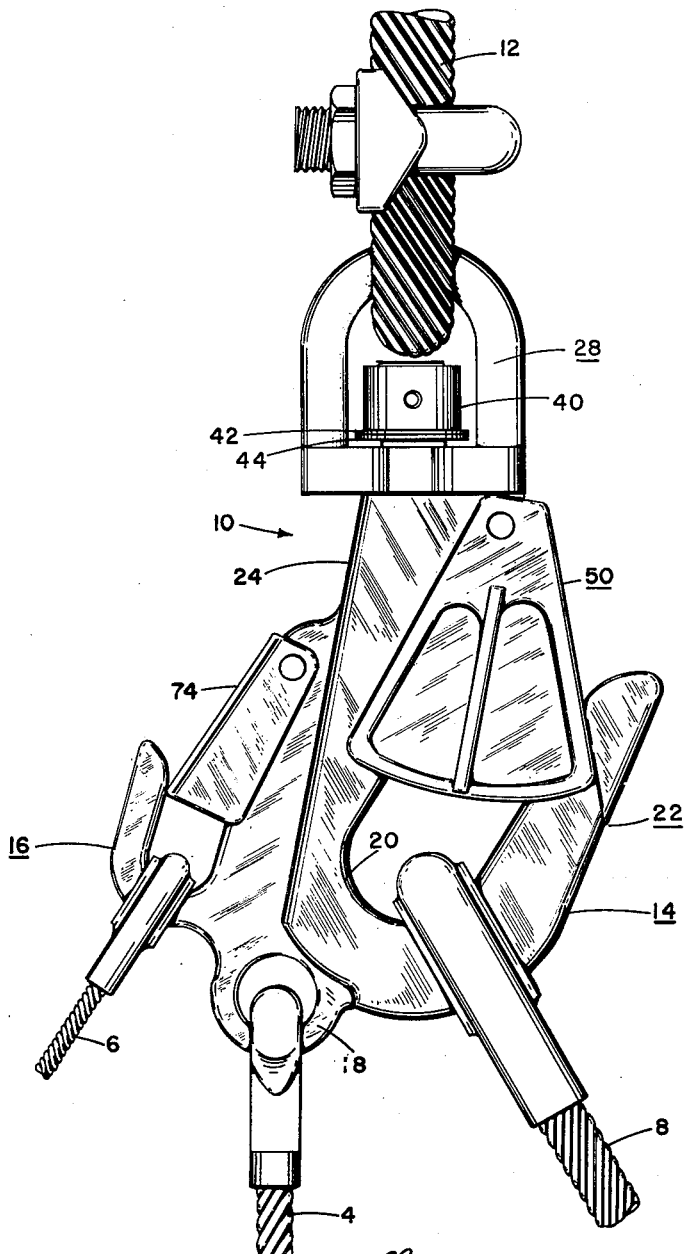

July 13, 1965    M. N. GOLDFUSS    3,194,598
HELICOPTER RESCUE HOOK

Filed Sept. 18, 1963    2 Sheets-Sheet 1

INVENTOR.
MARTIN N. GOLDFUSS
BY
Arthur L. Collins

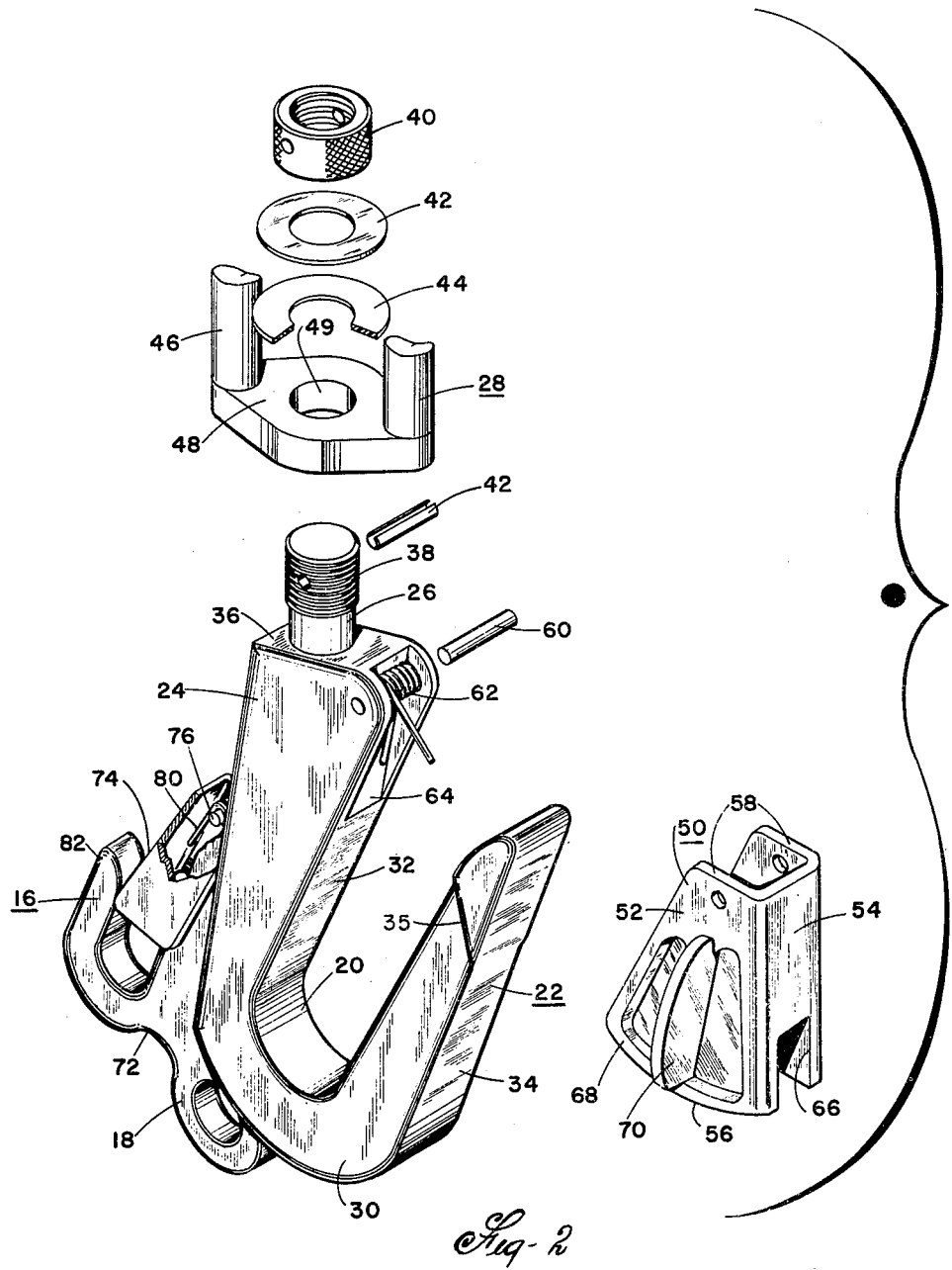

3,194,598
HELICOPTER RESCUE HOOK
Martin N. Goldfuss, Broomall, Pa., assignor to the United States of America as represented by the Secretary of the Navy
Filed Sept. 18, 1963, Ser. No. 309,903
3 Claims. (Cl. 294—78)
(Granted under Title 35, U.S. Code (1952), sec. 266)

The invention described herein may be manufactured and used by or for the Government of the United States of America for governmental purposes without the payment of any royalties thereon or therefor.

This invention relates to load handling devices and particularly to hooks for supporting one or more loads.

In the rescue of personnel, as a pilot at sea after being ejected from an aircraft, a line is suspended from a hovering helicopter to him. If the pilot is injured, someone is lowered to the pilot together with various gear needed to raise him into the helicopter.

This invention provides a load handling device in the form of a multiple hook, with an attached ring, to which different loads may simultaneously be connected. It is relatively inexpensive to manufacture, rugged in construction, and suitable for sea water conditions. Swivelling is effectively and simply furnished, and latching is safe and readily actuated.

Various other features and advantages of the invention will become apparent from reading the following description, with reference to the drawings.

In the drawings:

FIG. 1 is a perspective view of a device made in accordance to the invention; and FIG. 2 is an exploded perspective view with parts of some of the elements broken away.

Referring to the drawings, the handling device of this invention, indicated at 10, is shown suspended from a cable 12 lowered from an overhead position, as from a helicopter, not shown. The handling device 10 has facility for attaching three separate loads; one secured by a line 8 to its main or large hook 14, a second connected by a line 6 to its small hook 16 and a third secured by a line 4 to the eye 18. The large hook 14 is designed for safely supporting personnel; whereas, the small hook 16 and eye 18 carry various gear, not shown, used in rescue operations. The hooks 14 and 16 are back to back and the eye 18 is disposed beneath them at the heels of their shanks. This positioning gives the handling device an over-all flat, compact appearance.

The eye 18 in combination with the hooks 14 and 16 avail the handling device 10 with flexibility in the loads that can be simultaneously attached to it. Some rescue gear have lines with snap hooks. These are readily secured to the eye 18, while lines with ring fittings connect to the hooks 14 and 16. To endure sea water operations, the handling device is made of non-corrosive material, preferably stainless steel.

The main hook 14 includes a throat 20 formed between a bill 22 and a shank 24 on which there is a cylindrical stem or projection 20 for mounting a bail 28. The throat 26 is arcuate at its curved portion and its center is on the center line of the projection 26 to avoid canting the handling device when loaded. The sides, 30, of the hook are flat and bounded by an inner surface 32 and outer surface or back 34 without forming any sharp edge at their joints which are likely to cut a load line suspended from it. At the tip of the bill 22 the sides, 30, are raised to form shoulders or latch stops 35.

On the shank 24 the sides 30 widen toward the top 36 which is flat and from which the cylindrical projection 26 extends. The outermost part of the projection 26 is threaded, at 38, and carries a nut 40 that provides a head for holding the bail 28. A spring pin 42, which is longitudinally slit resilient tube, passes through the nut 40 and projection 26 to hold the nut from turning loose.

Disposed on the projection 26 under the nut 40 there is a rigid metallic washer 42 and between it and the bail 28, a bearing or anti-friction element 44, which is preferably a Delrin ring. The latter is an acetal resinous material manufactured by the E. I. du Pont de Nemours and Co. of Wilmington, Delaware, which has been found to have qualities that make it serviceable in sea water as a thrust bearing, thus eliminating the need for the usual ball bearing. Teflon has been used in place of the Delrin bearing element 44 and found to be unsatisfactory because it extruded under the load and swivelling was difficult. The washer 42 is larger in diameter than the nut 40 to increase the area for supporting the bearing element 44.

The bail 28 is shaped like a D which is turned to with its curved portion 46 directed upwardly. The straight or base portion 48 of the bail is widened intermediate its connections with the curved portion 46 and in a plane perpendicular to the latter, and has an aperture 49 through which it is mounted on the shank's projection 26. The widened base 48 of the bail fully covers the lower end area of the bearing element 44, and the washer 42 similarly covers its upper end area, so that loading of the handling device will not deform the bearing element 44, which might otherwise occur.

A latch 50 is furnished on the large hook 14 which is deemed to be readily operable and yet assures safety against accidental opening. It is U-like in cross-section having parallely spaced sides, 52, joined along one edge by an end 54. The sides 52 are sectors of a circle having an arcuate lower edge 56 and a truncated apex 58. A pin 60 through the apex 58 pivotally secures the latch to the upper portion of the shank 24, which closely fits between the latch's sides 52. The latch swings on the pin 60 in the plane of the shank 24 between closed and opened positions and is normally urged to the closed position by a spring 62 mounted on the pin 60. A groove 64 in the inner surface 32 of the shank 26 is provided to accommodate the spring 62. In order to have an effective engagement of the latch 50 with the bill 22, the end 54 of the latch has its lower portion removed forming a slot 66 to permit the latch to move over the bill and against the stops 35. When that latch is closed both the hook's shank 24 and bill 22 are between the latch's sides 52. This construction assures a positive working action to the latch and reduces the possibility of its sideway deflection by a load line to permit release of a load from the hook.

For reinforcement, extending from the surface of the latch's sides 52 around the edges thereof there is a rib 68, and extending longitudinally downwardly across its center a rib 70. Rib 70 is slightly higher than the edge rib 68 in order that it may be grasped for easy manipulation of the latch, in place of inward pressing on the end 54 as is usual with a latch.

The small hook 16 is similar, in general, to the large hook 14. Its shank 72 is integral with that, 24, of the large hook 14. The hooks, 14 and 16, are disposed back to back, at their shanks, with the smaller hook 16 near the lower end of the larger hook. The smaller hook 16 is thinner than the large hook 14 so that the latch 50 may move over it, as well as its latch 74, when in an open position.

The latch 74, U-shaped in cross-section, is pivoted on a pin 76 passing through the upper portion of the small hook's shank 72. A groove is provided in the shank 72 to accommodate a spring 80 mounted on the pin 76 which urges the latch 74 to a closed position. In the closed position, the lower end of the latch 74 abuts the inner surface of the small hook's bill 82.

The eye 18 is of the same thickness as the small hook 16 and is disposed in the same plane with it at the heels of the shanks 24 and 72. Preferably, hooks 14, 16, and eye 18 are integrally formed of one piece of stainless steel material for strength and resistance to corrosion (sea water).

With the handling device described a person can be suspended from the large hook 14 with considerable safety against unhooking. At the same time equipment which the person may need in performing his task can be coupled to the small hook 16 and ring 18, freeing his hands from otherwise holding such equipment. The swivel is of simple, relatively cheap construction and has been found to perform well under 5500 pound loads on a handling device four inches long and one half inch in thickness.

The foregoing is considered as illustration of the principles of the invention. Numerous modifications and changes will readily occur to those skilled in the art; therefore, it is intended that invention be limited only as set forth in the appended claims.

What is claimed is:
1. A multiple load handling device comprising:
   (a) a main hook having a shank and a bill with a throat therebetween;
   (b) a bail swivelly mounted on said shank;
   (c) means securing said bail to said shank;
   (d) an anti-friction element interposed between bail and said means securing thereof;
   (e) a latch pivotally secured to said shank for movement between open and closed positions having sides and an end with the lower portion removed, said shank being disposed between said sides in the open and closed positions of said latch and said bill extending through said slot and between said sides when said latch is in closed position;
   (f) resilient means urging said latch to a closed position;
   (g) a secondary hook having a bill and a shank;
   (h) said main and secondary hooks being integrally connected at the backs of their shanks;
   (i) latch means pivotally secured to the shank of said secondary hook for movement between open and closed positions; and
   (j) a ring member integral with said hooks disposed between the heels of their shanks.

2. The device of claim 1 wherein said throat is arcuate and the center thereof is on the extended axis about which the bail is swiveled on the shank of the main hook.

3. The device of claim 2 wherein said anti-friction element is a Delrin ring.

References Cited by the Examiner

UNITED STATES PATENTS

| | | | |
|---|---|---|---|
| 1,083,657 | 1/14 | Boice | 294—82 X |
| 2,277,183 | 3/42 | Reynolds | 24—235 |
| 2,553,133 | 5/51 | Conner | 294—82 X |

FOREIGN PATENTS 456,372  11/36  Great Britain.

SAMUEL F. COLEMAN, *Primary Examiner.*